(12) United States Patent
Saitoh et al.

(10) Patent No.: US 9,395,750 B2
(45) Date of Patent: Jul. 19, 2016

(54) WEARABLE APPARATUS

(71) Applicant: Panasonic Intellectual Property Management Co., Ltd., Osaka (JP)

(72) Inventors: Toshiaki Saitoh, Miyagi (JP); Yukinari Inoue, Shizuoka (JP); Shuichi Sugawara, Hyogo (JP); Hiroto Nishida, Osaka (JP); Yuuichi Oomura, Hyogo (JP); Hideyasu Uchiyama, Miyagi (JP); Ko Kondo, Miyagi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 53 days.

(21) Appl. No.: 14/417,954

(22) PCT Filed: Apr. 24, 2014

(86) PCT No.: PCT/JP2014/002314
§ 371 (c)(1),
(2) Date: Jan. 28, 2015

(87) PCT Pub. No.: WO2014/188663
PCT Pub. Date: Nov. 27, 2014

(65) Prior Publication Data
US 2015/0177782 A1    Jun. 25, 2015

(30) Foreign Application Priority Data

May 22, 2013  (JP) ................... 2013-107712
May 22, 2013  (JP) ................... 2013-107713
Jun. 21, 2013  (JP) ................... 2013-130165

(51) Int. Cl.
*G06F 1/16* (2006.01)
*A44C 5/12* (2006.01)
*A44C 5/00* (2006.01)

(52) U.S. Cl.
CPC ............... *G06F 1/1601* (2013.01); *A44C 5/12* (2013.01); *G06F 1/16* (2013.01); *G06F 1/163* (2013.01); *G06F 1/1652* (2013.01); *A44C 5/0015* (2013.01)

(58) Field of Classification Search
CPC .... H01L 29/78603; F41J 5/00; G06F 1/1601; G06F 1/1603
USPC ............. 361/679.03, 679.27, 679.55, 679.02; 345/175, 173, 156, 8, 46; 174/254, 174/338; 257/288, 40, 682; 455/566, 456.1, 455/456.2, 558, 411, 575.1, 420, 575.6, 455/567, 550.1
See application file for complete search history.

(56) References Cited

U.S. PATENT DOCUMENTS

2013/0044215 A1    2/2013  Rothkopf et al.
2015/0265917 A1*   9/2015  Chang ..................... F41J 5/00
                                                    463/7

(Continued)

FOREIGN PATENT DOCUMENTS

JP    2000-209319    7/2000
JP    2001-252109    9/2001

(Continued)

OTHER PUBLICATIONS

International Search Report of PCT application No. PCT/JP2014/002314 dated Jul. 8, 2014.

*Primary Examiner* — Hung Duong
(74) *Attorney, Agent, or Firm* — Greenblum & Bernstein, P.L.C.

(57) ABSTRACT

A wearable apparatus includes a flexible display device, and a flexible housing that holds the peripheral portion of the flexible display device. The flexible display device is disposed on the uppermost surface of the apparatus to serve as a reference for defining the total length of the apparatus, and the portion of the apparatus below the flexible display device contracts along the direction of the total length.

13 Claims, 19 Drawing Sheets

(56) References Cited

U.S. PATENT DOCUMENTS

2015/0335272 A1* 11/2015 Natale ................. A61B 5/0022
600/365
2016/0007678 A1* 1/2016 Silverman ............ A43B 13/122
36/136

FOREIGN PATENT DOCUMENTS

| JP | 2002-528811 | 9/2002 |
| JP | 2004-305645 | 11/2004 |
| JP | 2005-117224 | 4/2005 |
| WO | 00/25193 | 5/2000 |

* cited by examiner

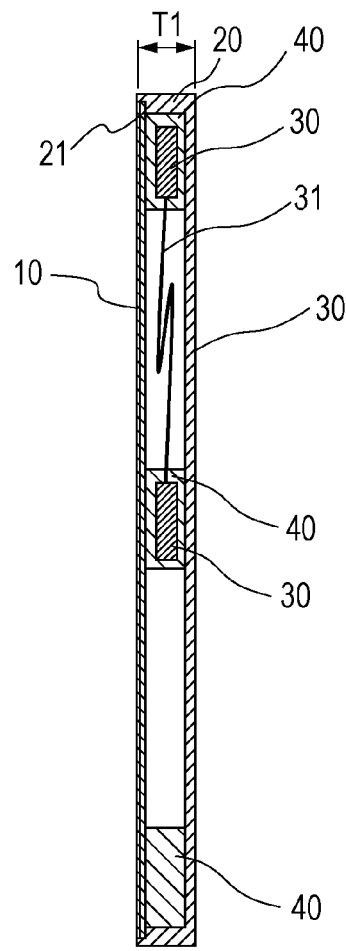
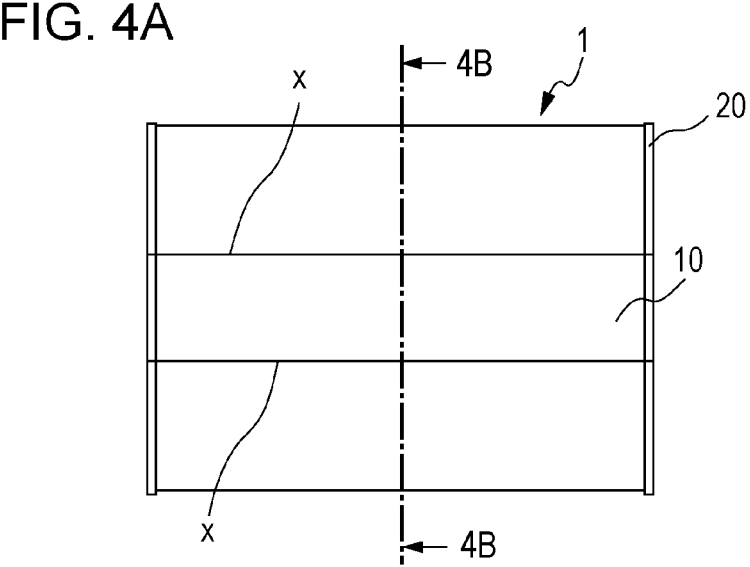

WEARABLE APPARATUS

TECHNICAL FIELD

The present disclosure relates to a wearable apparatus that can be worn on the wrist, arm, or the like.

BACKGROUND ART

Wearable apparatuses that can be worn on the wrist, arm, or the like have been proposed.

PTL 1 discloses a portable communication terminal that has rigid component blocks disposed around a flexible display.

PTL 2 discloses a cellular phone with a cellular phone body whose left and right portions are joined by a hinge in a manner that allows their opening and closing.

PTL 3 discloses a convex spring including a flexible display.

PTL 4 discloses a beverage protection cover that has two convex springs disposed side by side.

PTL 5 discloses an arm-wearable band for a portable apparatus which uses a convex spring.

CITATION LIST

Patent Literature

PTL 1: Japanese Unexamined Patent Application Publication No. 2005-117224
PTL 2: Japanese Unexamined Patent Application Publication No. 2000-209319
PTL 3: U.S. Patent Application Publication No. 2013/0044215
PTL 4: Japanese Unexamined Patent Application Publication No. 2004-305645
PTL 5: Japanese Unexamined Patent Application Publication No. 2001-252109

SUMMARY OF INVENTION

Technical Problem

However, in the case of PTLs 1 to 5 mentioned above, further improvements are required in terms of the ease of wearing the wearable apparatus on the wrist, arm, or the like.

Solution to Problem

A wearable apparatus according to an aspect of the present disclosure includes a flexible display device, a flexible housing that holds a peripheral portion of the display device, and a rigid device for causing the apparatus to function. The display device is disposed on an uppermost surface of the apparatus to serve as a reference for defining a total length of the apparatus, and a portion of the apparatus below the display device contracts along a direction of the total length.

Advantageous Effects of Invention

According to the above-mentioned aspect, the ease of wearing the wearable apparatus on the wrist, arm, or the like can be further improved.

BRIEF DESCRIPTION OF DRAWINGS

FIG. 3B is a sectional view, taken along a line 3B-3B, of the wearable apparatus illustrated in FIG. 3A.
FIG. 4A is a front view of a wrapped state of a wearable apparatus according to Embodiment 2.

DESCRIPTION OF EMBODIMENTS (Circumstances leading to invention of an aspect according to the present disclosure)

First, the conception behind an aspect according to the present disclosure will be described.

In PTL 1 mentioned above, the rigid components are disposed around the display, which allows reduced thickness at the expense of increased size of the apparatus. Further, the apparatus is worn on an arm in an arcuate shape, which limits the size of the rigid component blocks. Furthermore, the portion of the rigid component blocks does not become a smooth curved surface.

In PTL 2 mentioned above, multiple rigid housings are separated via the hinge, making it impossible to increase the size of the display.

Figure 4B:
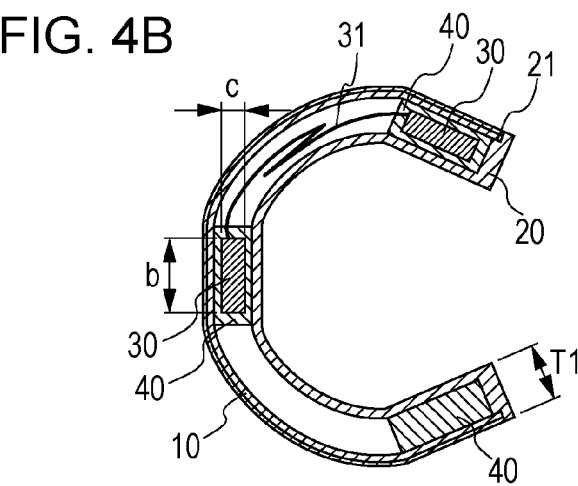
FIG. 4B is a sectional view, taken along a line 4B-4B, of the wearable apparatus illustrated in FIG. 4A.
Figure 7A:
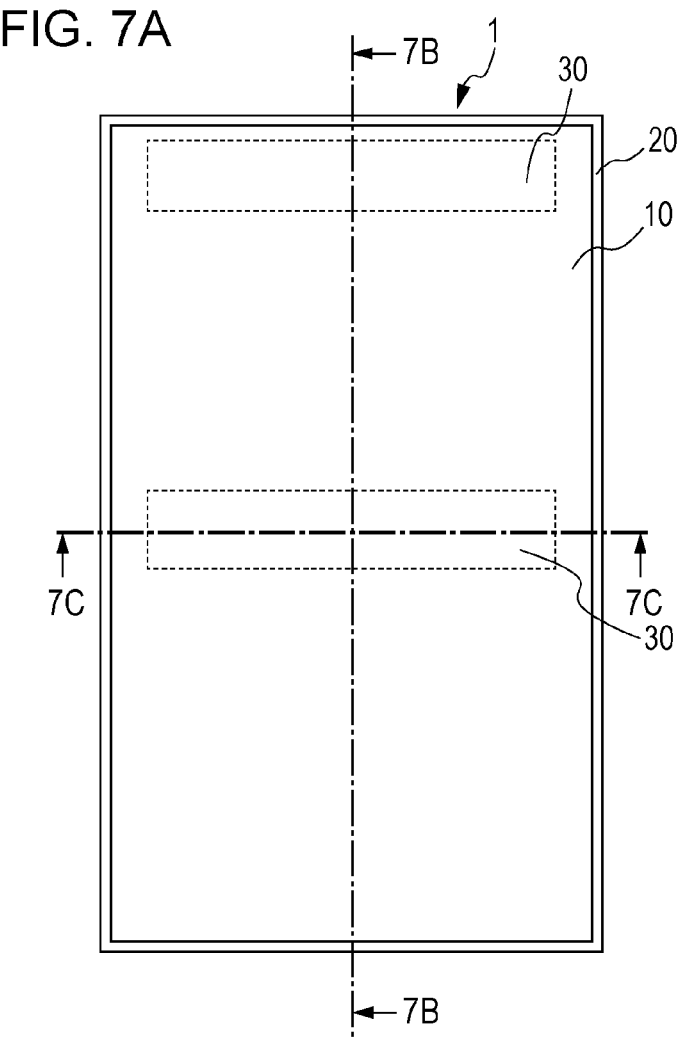
FIG. 7A is a front view of a flat state of a wearable apparatus according to Embodiment 5.

In PTL 3 mentioned above, if an electronic component is to be provided on top of the convex spring, the electronic component is limited to a flexible one (FIG. 4B). Further, if a rigid electronic component is to be used, the rigid electronic component needs to be provided by the side of the convex spring (FIG. 7A).

In PTL 4 mentioned above, the wrapping forces exerted by the two convex springs are equal. Consequently, for example, if the apparatus is to be worn on an arm, the difference between the thin part of the arm near the wrist and the thick part of the arm slightly above the wrist cannot be absorbed, resulting in poor wearing comfort.

In order not to hinder elastic deformation of a convex spring, it is necessary to provide a "relief", particularly with respect to the longitudinal direction. However, providing such a "relief" may conceivably make it difficult for the spring force to be transmitted to the apparatus body. Although transmission of the spring force is facilitated by manipulating the portion of the apparatus body where the convex spring exists, this is cumbersome because the user has to consciously manipulate the location where the convex spring exists. In this regard, PTL 4 does not disclose how to regulate the position of each convex spring within the apparatus body in a way that does not hinder elastic deformation of the convex spring while ensuring reliable transmission of the spring force to the apparatus body.

In PTL 5 mentioned above, the portable apparatus body is held in a way that does not hinder elastic deformation of the convex spring. However, the apparatus body is short relative to the total length of the convex spring and does not deform. Further, no consideration is given whatsoever about a "relief" with respect to the longitudinal direction.

On the basis of the above discussion, the present inventors have arrived at various aspects of the disclosure described below.

A wearable apparatus according to an aspect of the present disclosure includes a flexible display device, a flexible housing that holds a peripheral portion of the display device, and a rigid device for causing the apparatus to function. The display device is disposed on an uppermost surface of the apparatus to serve as a reference for defining a total length of the apparatus, and a portion of the apparatus below the display device contracts along a direction of the total length.

As a result, rigid components required for the functioning of the wearable apparatus can be disposed in the apparatus, while allowing the display to be made larger and the wearable apparatus to be made smaller at the same time.

In the above-mentioned aspect, the flexible housing may have a rigid housing part, and a rigid device for causing the apparatus to function may be disposed in the housing portion.

In this case, a greater number of rigid components with relatively large surface area (such as batteries, CPUs, display device drivers, memories, signal processors, radio circuits, antennas, and speakers) can be accommodated in the rigid housing part, thus further enhancing the function of the wearable apparatus.

In the above-mentioned aspect, the flexible housing may include a bellows structure.

In this case, the thickness of the wearable apparatus can be increased. That is, a greater number of rigid components with relatively large thickness (such as batteries, CPUs, display device drivers, memories, signal processors, radio circuits, antennas, and speakers) can be accommodated, thus further enhancing the function of the wearable apparatus.

In the above-mentioned aspect, the flexible housing may be made of an elastomer resin, the rigid housing part may be made of a resin having a low flexibility, and the flexible housing and the rigid housing part may be formed integrally by double-molding.

In this case, the flexible housing and the rigid housing are formed integrally. This eliminates the need for bonding and assembly processes using an adhesive or the like, and also increases the accuracy of placement. As a result, the wearable apparatus can be manufactured at low cost.

In the above-mentioned aspect, in a side wall portion of the rigid housing part which holds the peripheral portion of the flexible display device, at least two locations on both sides of a substantially central portion of the display device are separated from the rigid housing part.

In this case, the flexible display device can be deformed into a curved surface of substantially constant curvature, without causing the ridge lines to form on the flexible display device, thus enhancing the visibility and aesthetic appearance of the display surface.

A wearable apparatus according to another aspect of the present disclosure includes an apparatus body, and a plurality of convex springs. At least two of the plurality of convex springs have different spring characteristics from each other.

As a result, the convex springs have different curvatures in the wrapped state, so that the wearable apparatus in the wrapped state can be made to have a shape that is not a cylinder but a cone (truncated cone). That is, the wearing comfort of the wearable apparatus when wrapped around on an object of non-uniform thickness improves.

A wearable apparatus according to another aspect of the present disclosure includes an apparatus body, a convex spring, a center holding part that holds a substantially central portion of the convex spring to the apparatus body, and an end face holding part that is engaged with the apparatus body to hold the convex spring.

As a result, the position of the convex spring in the apparatus body can be regulated, enabling stable transmission of spring force in both the flat and wrapped states of the apparatus body.

In the above-mentioned aspect, the end face holding part may have a length that covers an end face portion of the convex spring, in both a flat state and a wrapped state of the apparatus body.

In this case, manipulation of the convex spring can be performed in a wider area than the end portion of the convex spring, thus allowing the apparatus body to be easily changed between the flat state and the wrapped state.

In the above-mentioned aspect, the end face holding part may have a shape that closely resembles a round sectional shape of the convex spring when the convex spring is in a flat state.

In this case, the space due to the round sectional shape of the convex spring can be effectively used. For example, this space can be utilized as a space for mounting an electronic component.

In the above-mentioned aspect, the end face holding part may be attached to an end face position of the apparatus body.

In this case, this configuration makes it possible to transmit the spring force of the convex spring to the end portion of the apparatus body, thus allowing stable deformation of the apparatus body between the flat state and the wrapped state. Furthermore, the apparatus body can be changed between the flat state and the wrapped state by manipulating the end portion of the apparatus body without having to directly manipulate the convex spring, thus allowing easy manipulation by the user of the apparatus.

Hereinafter, embodiments of the present disclosure will be described with reference to the drawings.

(Embodiment 1)

Figure 1A:
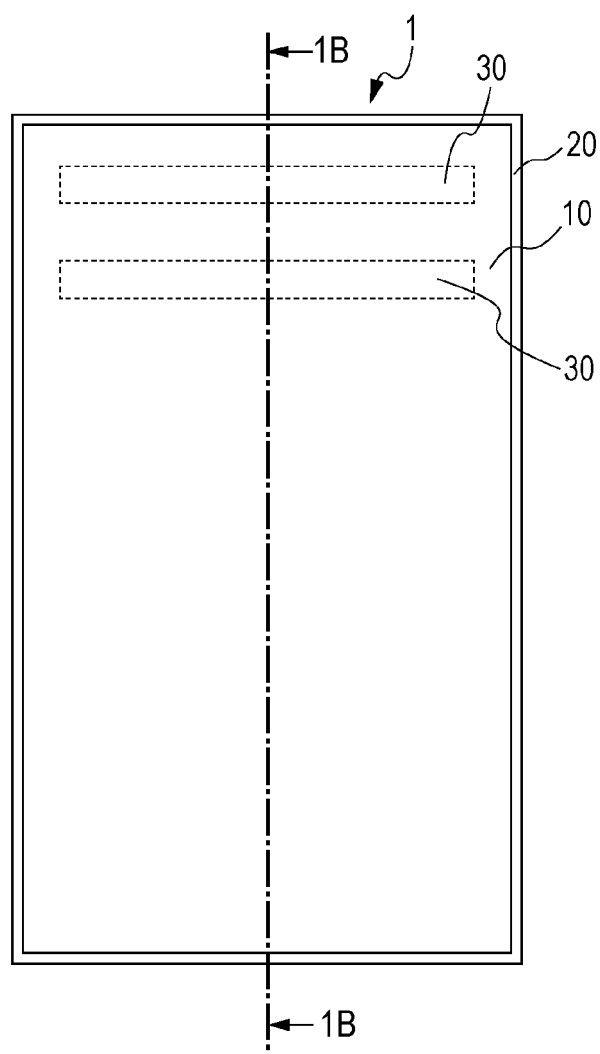
FIG. 1A is a front view of a flat state of a wearable apparatus according to Embodiment 1.
Figure 1B:
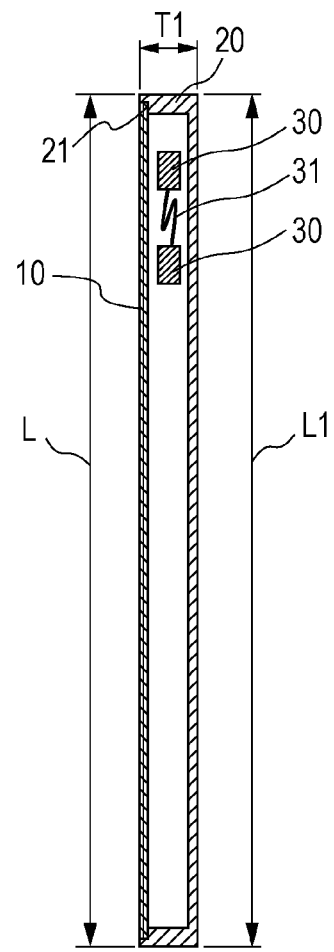
FIG. 1B is a sectional view, taken along a line 1B-1B, of the wearable apparatus illustrated in FIG. 1A.

FIG. 1A is a front view of a flat state of a wearable apparatus according to Embodiment 1 of the present disclosure. FIG. 1B is a sectional view, taken along a line 1B-1B, of the wearable apparatus illustrated in FIG. 1A.

In FIG. 1A and FIG. 1B, a flexible display device 10 has a rectangular shape that is elongated longitudinally. The four sides of the peripheral portion of the flexible display device 10 are stuck on a sticking seat surface 21 of a flexible housing 20 by means of an adhesive or a double-faced adhesive tape, forming a wearable apparatus 1.

The flexible display device 10 is formed by bonding components such as a flexible liquid crystal display (not illustrated), a touch panel (not illustrated), and a surface protection panel (not illustrated) together as appropriate. The flexible display device 10 is capable of being flexed to such an extent that allows the flexible display device 10 to be rolled up on the long side and wrapped around an arm. The flexible display device 10 is disposed on the uppermost surface of the wearable apparatus 1 so that its display unit is visible.

The flexible housing 20 is made of an elastic and flexible material such as urethane foam. Like the flexible display device 10, the flexible housing 20 can be rolled up on the long side and wrapped around an arm or the like. Component blocks 30 for causing the wearable apparatus 1 to function are disposed inside the flexible housing 20 as appropriate. The component blocks 30 are, for example, batteries, CPUs, display device drivers, memories, signal processors, radio circuits, antennas, or speakers. The component blocks 30 are interconnected by a flexible cable 31 to allow functioning of the wearable apparatus 1. Although only a single set of the component blocks 30 and the flexible cable 31 is illustrated in FIGS. 1A and 1B for the sake of convenience, multiple sets of these components required for the functioning of the wearable apparatus 1 are disposed inside the flexible housing 20.

A total length L of the flexible housing 20 is determined by the length of the long side of the flexible display device 10 disposed on the uppermost. L1 denotes the total length of a surface of the flexible housing 20 on which the flexible display device 10 is not stuck (the side opposite to the sticking surface). When the wearable apparatus 1 is in a "state not worn on an arm or the like (flat state)" illustrated in FIGS. 1A and 1B, L is substantially equal to L1. The thickness of the flexible housing 20 is denoted by T1.

Figure 2A:
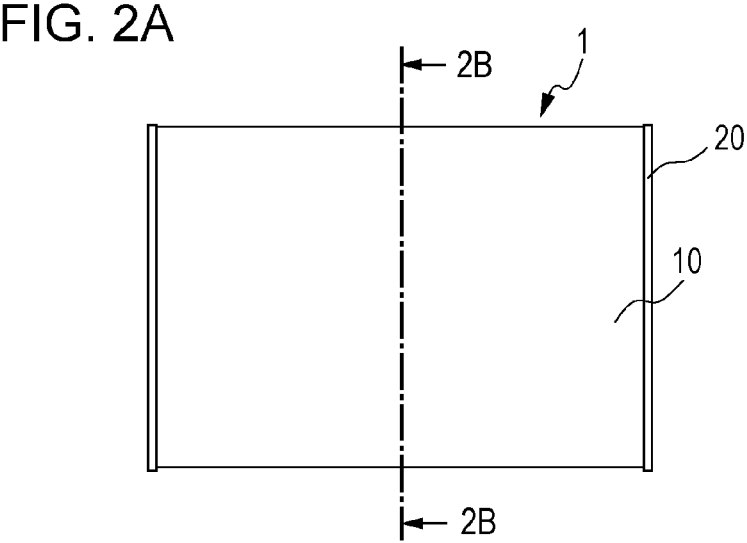
FIG. 2A is a front view of a wrapped state of a wearable apparatus according to Embodiment 1.
Figure 2B:
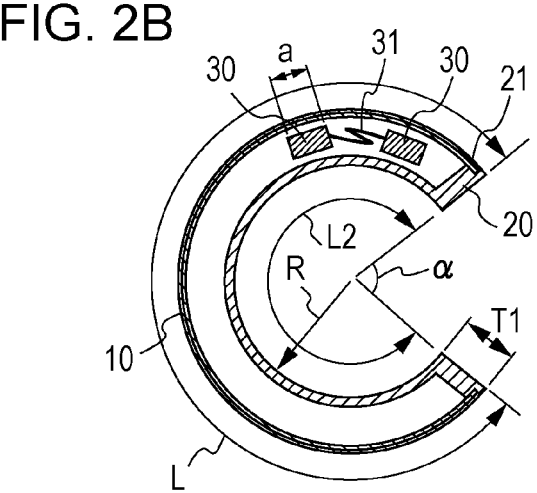
FIG. 2B is a sectional view, taken along a line 2B-2B, of the wearable apparatus illustrated in FIG. 2A.

FIG. 2A is a front view of a wrapped state of a wearable apparatus according to Embodiment 1. FIG. 2B is a sectional view, taken along a line 2B-2B, of the wearable apparatus illustrated in FIG. 2A. In FIGS. 2A and 2B, the same components as those in FIGS. 1A and 1B are denoted by the same symbols, and a description of such components is omitted.

FIGS. 2A and 2B illustrate a state in which the wearable apparatus 1 is wrapped and worn around an arm or the like, forming a substantially cylindrical shape. In the wrapped state, the wearable apparatus 1 is rolled up with the flexible display device 10 on its uppermost surface being located on the outside of the wearable apparatus 1. L2 denotes the total length of a surface of the flexible housing 20 on which the flexible display device 10 is not stuck (the side opposite to the sticking surface). In a state in which the wearable apparatus 1 is rolled up in a substantially cylindrical shape, L2 equals the length of the inner arc. In the flexible housing 20, let R represent the radius (inner diameter) of the portion corresponding to the inner side of a tube having the substantially cylindrical shape. Let α represent the angle formed by the two short sides of the flexible housing 20 and the center of the tube. Further, let "a" represent the width dimension of the component blocks 30. The width dimension "a" of the component blocks 30 is set to be within a range that does not hinder deformation of the wearable apparatus 1 into the wrapped state.

Operation of the wearable apparatus 1 configured as described above will be described.

The shape of the wearable apparatus 1 differs between when the wearable apparatus 1 is worn on an arm or the like and when the wearable apparatus 1 is not worn on an arm or the like. When not worn on an arm or the like, the wearable apparatus 1 has a flat shape as illustrated in FIGS. 1A and 1B, which is suitable for using or manipulating the screen. When the wearable apparatus 1 is to be worn on an arm or the like, the wearable apparatus 1 is rolled up on the long side into a substantially cylindrical shape as illustrated in FIGS. 2A and 2B so that the wearable apparatus 1 can be wrapped around an arm or the like, offering good portability.

In FIGS. 2A and 2B, when the wearable apparatus 1 is in a substantially cylindrical shape, as the flexible housing 20 moves, the component blocks 30 also change their orientation. Although the component blocks 30 are themselves rigid and have no flexibility, the flexible cable 31 having flexibility allows the component blocks 30 to change their orientation with respect to each other with the movement of the flexible housing 20 while remaining functioning.

The total length L illustrated in FIG. 1B does not change while the wearable apparatus 1 undergoes deformation from the flat state (FIG. 1B) into the wrapped state (FIG. 2B), because the total length L is determined by the length of the long side of the flexible display device 10 that does not expand and contract. That is, the length L of the arc illustrated in FIG. 2B is equal to the total length L illustrated in FIG. 1B. The total length L is the length of the arc of a circle with a radius equal to "inner diameter R+thickness T1". Accordingly, the total length L is expressed by (Equation 1) below.

$$L=2\pi(R+T1)(\alpha/360°) \quad \text{(Equation 1)}$$

In the meantime, the total length L1 illustrated in FIG. 1B changes to the length L2 of the arc illustrated in FIG. 2B. At this time, L2 is the length of the arc of a circle with the radius R. Accordingly, L2 is expressed by (Equation 2) below.

$$L2=2\pi R(\alpha/360°) \quad \text{(Equation 2)}$$

As described above, when the wearable apparatus 1 is in the "state not worn on an arm or the like (flat state)", L is substantially equal to L1. Therefore, the total length L1 illustrated in FIG. 1B changes to the length L2 of the inner arc illustrated in FIG. 2B.

From (Equation 1) and (Equation 2), it follows that in comparison to L, L2 is the length of the arc of a circle whose radius is smaller by an amount corresponding to the thickness T1. Hence, L2 takes a value that is smaller than L in accordance with the thickness T1. This indicates that the portion of the flexible housing 20 located below (inward) of the sticking seat surface 21 on which the flexible display device 10 is stuck needs to expand and contract along the direction of the total length.

Now, let it be assumed that the total length L=180 mm, the thickness T1=3 mm, and the inner diameter R=30 mm. Then, α can be determined from (Equation 1) as α=47.5°. At this time, the length L2 of the arc is determined from (Equation 2) as L2=163.6 mm. The inner diameter R=30 mm assumes the thickness of the wrist of a person who wears the wearable apparatus 1.

It follows that as the wearable apparatus 1 undergoes deformation from the "state not worn on an arm or the like (flat state)" illustrated in FIG. 1B into a "state wrapped and worn around an arm or the like (wrapped state)" illustrated in FIG. 2B, the total length L1=180 mm needs to contract by 16.4 mm to become L2=163.6 mm. At this time, the contraction percentage of the total length is approximately 9.1 percent.

Because the flexible housing 20 is made of an elastic and flexible material such as urethane foam, the flexible housing 20 is generally capable of contracting at a contraction percentage of not more than 10 percent.

According to Embodiment 1, the flexible display device 10 is disposed on the uppermost surface of the apparatus to serve as the reference for defining the total length of the apparatus, and the portion of the apparatus below the sticking seat surface 21 on which the flexible display device 10 is stuck contracts along the direction of the total length, thus allowing deformation of the apparatus between the flat state and the wrapped state.

Furthermore, substantially the entirety of one surface of the wearable apparatus 1 having a longitudinally elongated rectangular shape can be used as a display surface. As a result, the apparatus can be made larger, and the display can be made smaller. In Embodiment 1, the section illustrated in FIG. 2B have a substantially C-shape. However, the section may have an O-shape or, further, the section may have partially overlapping portions, as long as the shape of the section allows the wearable apparatus 1 to be wrapped and worn around an arm or the like.

(Embodiment 2)

Figure 3A:
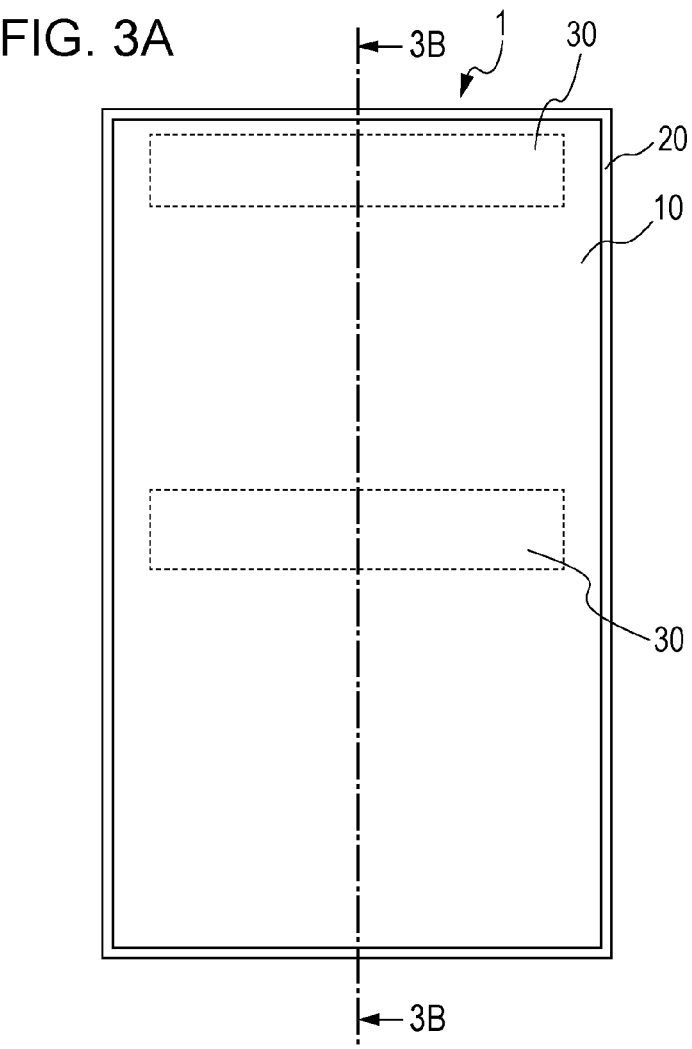
FIG. 3A is a front view of a flat state of a wearable apparatus according to Embodiment 2.

FIG. 3A is a front view of a flat state of a wearable apparatus according to Embodiment 2 of the present disclosure. FIG. 3B is a sectional view, taken along a line 3B-3B, of the wearable apparatus illustrated in FIG. 3A. In FIGS. 3A and 3B, the same components as those in FIGS. 1A and 1B are denoted by the same symbols, and a description of those components is omitted.

In FIGS. 3A and 3B, a rigid housing 40 is made of a rigid material that has neither elasticity nor flexibility, such as ABS resin. The rigid housing 40 is disposed in three separate locations that are the central and opposite end portions of the flexible housing 20. The flexible housing 20 is covered so as to enwrap the rigid housing 40. Therefore, the portions of the flexible housing 20 which contain the rigid housing 40 have neither elasticity nor flexibility. Further, the rigid housing 40 is secured in place with an adhesive or the like at the contact surface with the flexible housing 20.

Each of the component blocks 30 is accommodated inside the rigid housing 40 provided at each of the three locations. The component blocks 30 are interconnected by the flexible cable 31 to allow functioning of the wearable apparatus 1. Although only a single set of the component blocks 30 and the flexible cable 31 is illustrated in FIGS. 3A and 3B for the sake of convenience, multiple sets of these components required for the functioning of the wearable apparatus 1 are disposed inside the rigid housing 40.

FIG. 4A is a front view illustrating a state (wrapped state) in which a wearable apparatus is rolled up on the long side according to Embodiment 2 of the present disclosure. FIG. 4B is a sectional view, taken along a line 4B-4B, of the wearable apparatus illustrated in FIG. 4A. In FIGS. 4A and 4B, the same components as those in FIGS. 1A and 1B and FIGS. 3A and 3B are denoted by the same symbols, and a description of those components is omitted.

FIGS. 4A and 4B illustrates a state in which the wearable apparatus 1 is wrapped and worn around an arm or the like, forming a substantially cylindrical shape. In the wrapped state, the wearable apparatus 1 is rolled up with the flexible display device 10 on its uppermost surface being located on the outside of the wearable apparatus 1. It is to be noted that "x" denotes ridge lines (fold lines) on the flexible display device 10, which are created because the rigid housing part does not have flexibility (does not bend). Further, "b" denotes the width dimension of the component blocks 30. The width dimension "b" of the component blocks 30 is set to be within a range that allows the component blocks 30 to be accommodated in the rigid housing 40, and allows the wearable apparatus 1 to be deformed into the wrapped state and worn on an arm or the like. Further, "c" denotes the thickness dimension of the component blocks.

Operation of the wearable apparatus configured as described above will be described.

In FIGS. 4A and 4B, when the wearable apparatus 1 is in a substantially cylindrical shape, as the flexible housing 20 moves, the rigid housing 40 also changes its orientation. At this time, the flexible cable 31 having flexibility allows the component blocks 30 accommodated in the rigid housing 40 to change their orientation with respect to each other with the movement of the flexible housing 20 while remaining functioning.

The portions (three locations) of the flexible housing 20 which contain the rigid housing 40 have no flexibility and are thus not bendable. However, the substantially C-shaped sectional shape as illustrated in FIG. 4B allows wrapping around an arm or the like.

According to Embodiment 2, the provision of the rigid housing 40 allows the width dimension "b" of the component blocks 30 to be made comparatively larger than the width dimension "a" of the component blocks 30 illustrated in FIG. 2B. That is, the wearable apparatus 1 can accommodate a greater number of rigid components with relatively large surface area (such as batteries, CPUs, display device drivers, memories, signal processors, radio circuits, antennas, and speakers), thus further enhancing the function of the wearable apparatus 1. That is, the wearable apparatus 1 can be deformed between the flat state and the wrapped state, while having rigid components required for its functioning disposed in the apparatus.

Because the component blocks 30 are accommodated in the rigid housing 40, the component blocks 30 can be protected from external impact or the like.

In Embodiment 2, the rigid housing 40 is disposed in three separate locations. However, the rigid housing 40 may be disposed in one or two, or further, four or five separate locations, as long as the wearable apparatus 1 can be deformed into the wrapped state. Further, the exact locations to dispose the rigid housing 40 are not limited, either.

(Embodiment 3)

Figure 5A:
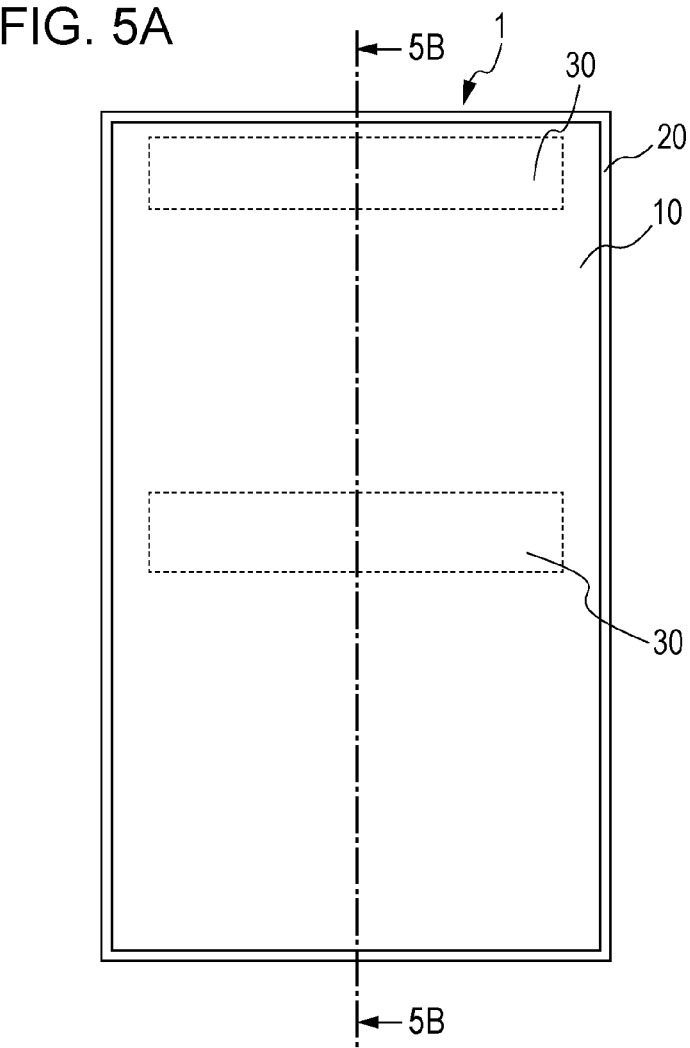
FIG. 5A is a front view of a flat state of a wearable apparatus according to Embodiment 3 and Embodiment 4.
Figure 5B:
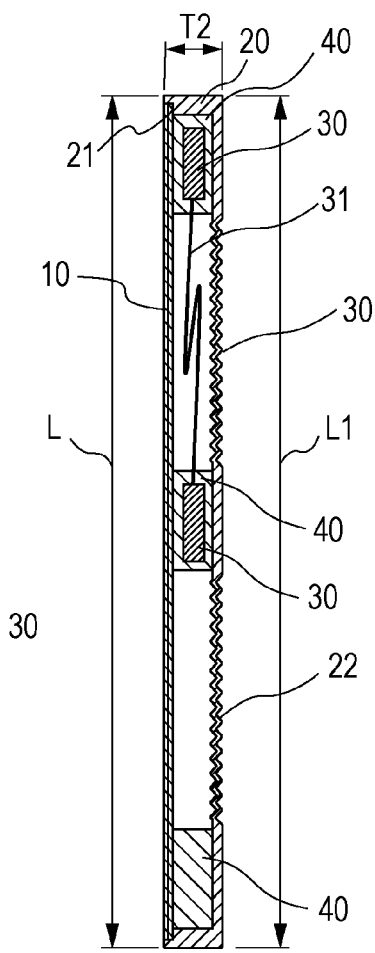
FIG. 5B is a sectional view, taken along a line 5B-5B, of the wearable apparatus illustrated in FIG. 5A.

FIG. 5A is a front view of a flat state of a wearable apparatus according to Embodiment 3 of the present disclosure. FIG. 5B is a sectional view, taken along a line 5B-5B, of the wearable apparatus illustrated in FIG. 5A. In FIGS. 5A and 5B, the same components as those in FIGS. 1A and 1B and FIGS. 3A and 3B are denoted by the same symbols, and a description of those components is omitted.

In FIGS. 5A and 5B, the flexible housing 20 is made of flexible elastomer resin such as silicon rubber. The surface of the flexible housing 20 which is worn on an arm or the like forms a bellows structure 22, except for the portion that covers the rigid housing 40. The portion of the bellows structure 22 has flexibility, and is capable of contracting along the direction of the total length of the wearable apparatus 1. Further, the rigid housing 40 is secured in place with an adhesive or the like at the contact surface with the flexible housing 20.

Figure 6A:
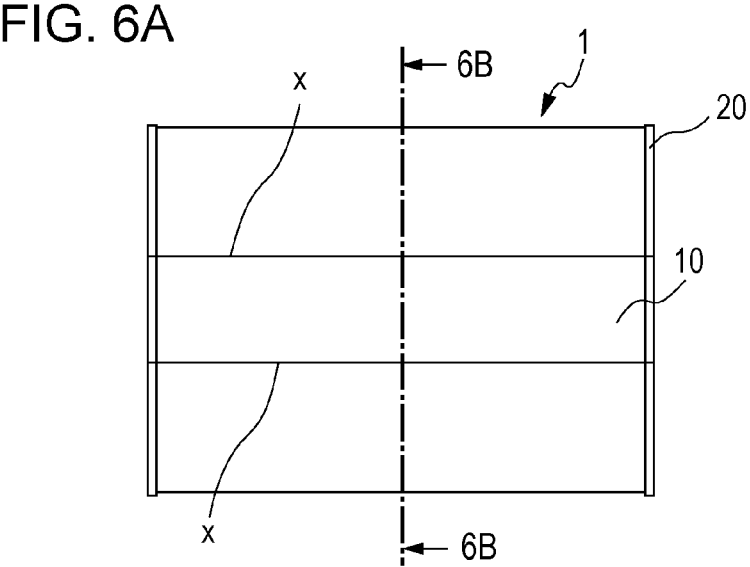
FIG. 6A is a front view of a wrapped state of a wearable apparatus according to Embodiment 3 and Embodiment 4.

FIG. 6A is a front view illustrating a state (wrapped state) in which a wearable apparatus is rolled up on the long side according to Embodiment 3 of the present disclosure.

Figure 6B:
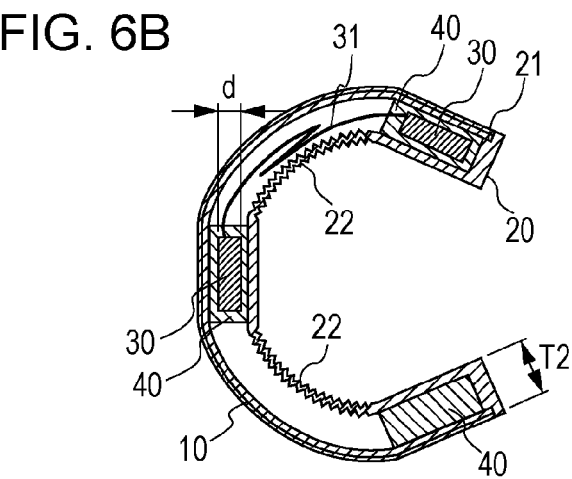
FIG. 6B is a sectional view, taken along a line 6B-6B, of the wearable apparatus illustrated in FIG. 6A.

FIG. 6B is a sectional view, taken along a line 6B-6B, of the wearable apparatus illustrated in FIG. 6A. In FIGS. 6A and 6B, the same components as those in FIGS. 1A and 1B and FIGS. 5A and 5B are denoted by the same symbols, and a description of those components is omitted.

In FIGS. 6A and 6B, the bellows structure 22 allows the flexible housing 20 to contract along the direction of the total length. As a result, a thickness T2 of the wearable apparatus 1 can be made larger.

Specifically, the thickness T1 of the wearable apparatus 1 according to Embodiment 1 described above with reference to FIGS. 1B and 2B is 3 mm. Referring to the same figures, assuming that the total length L and the inner diameter R are the same as in Embodiment 1, that is, the total length L=180 mm and the inner diameter R=30 mm, and that the thickness T2=8 mm, α can be determined from (Equation 1) as α=88.6°. At this time, the length L2 of the arc is determined as L2=142.1 mm from (Equation 2).

It follows that as the wearable apparatus 1 undergoes deformation from the "state not worn on an arm or the like (flat state)" illustrated in FIG. 1B into the "state wrapped and worn around an arm or the like (wrapped state)" illustrated in FIG. 2B, the total length L1=180 mm needs to contract by 37.9 mm to become L2=142.1 mm. At this time, the contraction percentage of the total length is approximately 21 percent.

Because the flexible housing 20 is made of flexible elastomer resin such as silicon rubber, and further has the bellows structure 22, the flexible housing 20 is capable of contracting along the direction of the total length of the wearable apparatus 1, allowing contraction even at a contraction percentage in the neighborhood of 20 percent. Therefore, the thickness T2 of the wearable apparatus 1 can be made larger.

As a result, a thickness dimension "d" of the component blocks illustrated in FIG. 6B can be made larger than the thickness dimension "c" of the component blocks illustrated in FIG. 4B.

According to Embodiment 3, the flexible housing 20 has the bellows structure 22. Therefore, the thickness T2 of the wearable apparatus can be made larger. As a result, the thickness "d" of the component blocks 30 can be made larger.

That is, the wearable apparatus 1 can accommodate a greater number of rigid components with relatively large thickness (such as batteries, CPUs, display device drivers, memories, signal processors, radio circuits, antennas, and speakers), thus further enhancing the function of the wearable apparatus 1. That is, the wearable apparatus 1 can be deformed between the flat state and the wrapped state, with enough rigid components required for the functioning of the wearable apparatus 1 being disposed in the apparatus.

In Embodiment 3, the rigid housing 40 is disposed in three separate locations. However, the rigid housing 40 may be disposed in one or two, or further, four or five separate locations, as long as the wearable apparatus 1 can be deformed into a substantially cylindrical form. Further, the exact locations to dispose the rigid housing 40 are not limited, either.

(Embodiment 4)

A configuration according to Embodiment 4 will be described with reference to FIGS. 5A, 5B, 6A, and 6B.

In FIGS. 5A, 5B, 6A, and 6B, the flexible housing 20 is made of elastomer resin such as silicon rubber, and the rigid housing 40 is made of a relatively rigid material such as ABS resin. The flexible housing 20 and the rigid housing 40 are formed integrally by double-molding.

According to Embodiment 4, the flexible housing 20 and the rigid housing 40 are formed integrally. This eliminates the need for bonding and assembly processes using an adhesive or the like, and also increases the accuracy of placement. As a result, the wearable apparatus 1 can be manufactured at low cost.

(Embodiment 5)

Figure 7B:
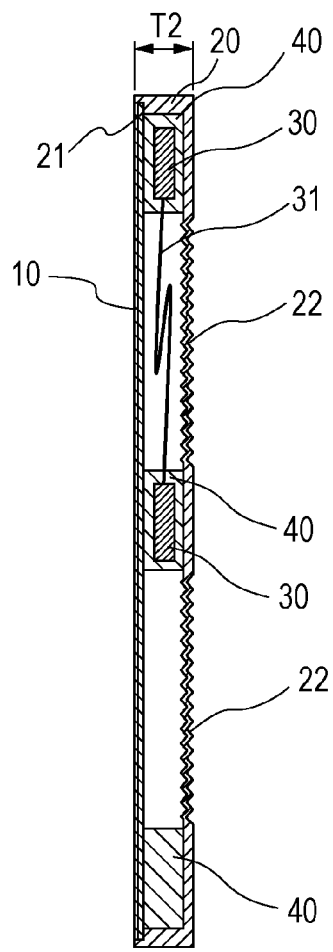
FIG. 7B is a sectional view, taken along a line 7B-7B, of the wearable apparatus illustrated in FIG. 7A.
Figure 7C:
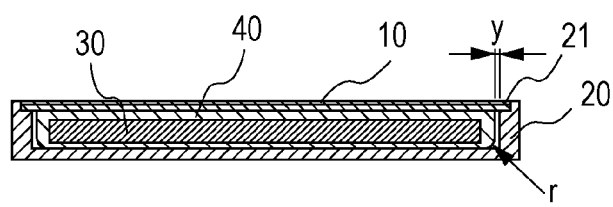
FIG. 7C is a sectional view, taken along a line 7C-7C, of the wearable apparatus illustrated in FIG. 7A.

FIG. 7A is a front view of a flat state of a wearable apparatus according to Embodiment 5 of the present disclosure. FIG. 7B is a sectional view, taken along a line 7B-7B, of the wearable apparatus illustrated in FIG. 7A. FIG. 7C is a sectional view, taken along a line 7C-7C, of the wearable apparatus illustrated in FIG. 7A.

In FIG. 7C, a gap "y" is provided between the side wall portions of the flexible housing 20 and the rigid housing 40, separating the flexible housing 20 and the rigid housing 40 from each other. Further, as indicated by "r" in FIG. 7C, desirably, the corner portion between the bottom surface and the side wall portion of the rigid housing 40 is rounded or beveled.

Figure 8A:
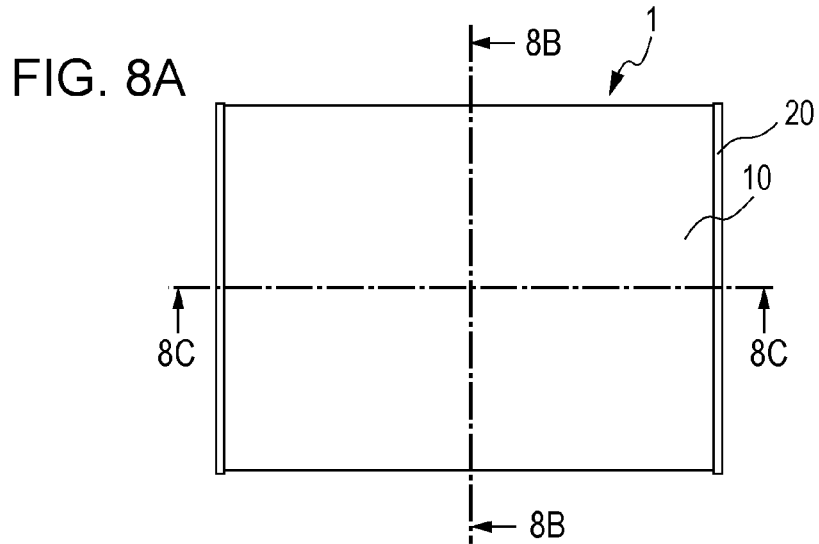
FIG. 8A is a front view of a wrapped state of a wearable apparatus according to Embodiment 5.
Figure 8B:
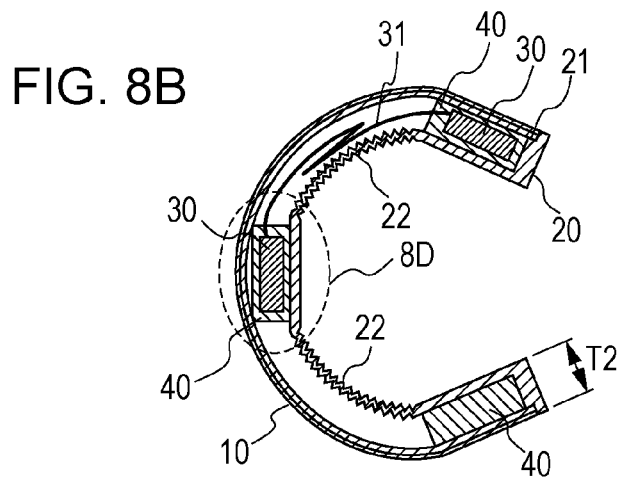
FIG. 8B is a sectional view, taken along a line 8B-8B, of the wearable apparatus illustrated in FIG. 8A.
Figure 8C:
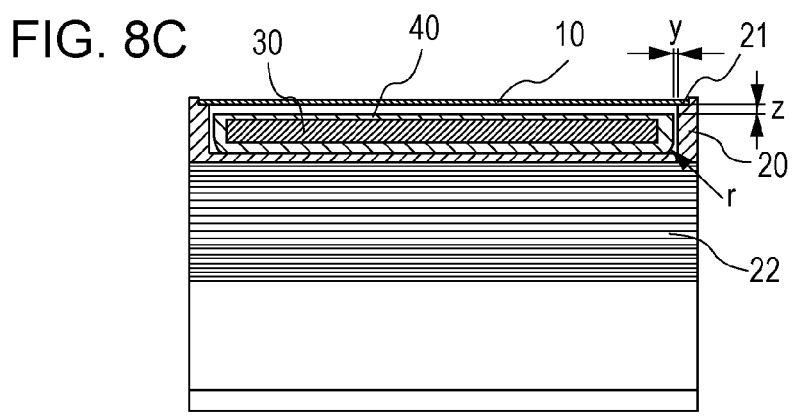
FIG. 8C is a sectional view, taken along a line 8C-8C, of the wearable apparatus illustrated in FIG. 8A.
Figure 8D:
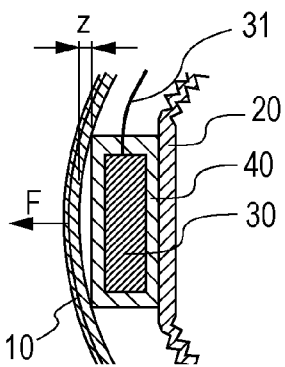
FIG. 8D is an enlarged view of a portion 8D of the wearable apparatus illustrated in FIG. 8B.

FIG. 8A is a front view illustrating a state (wrapped state) in which a wearable apparatus is rolled up on the long side according to Embodiment 5. FIG. 8B is a sectional view, taken along a line 8B-8B, of the wearable apparatus illustrated in FIG. 8A. FIG. 8C is a sectional view, taken along a line 8C-8C, of the wearable apparatus illustrated in FIG. 8A. FIG. 8D is an enlarged view of a portion 8D of the wearable apparatus illustrated in FIG. 8B.

In FIGS. 8C and 8D, a gap with a maximum dimension "z" is created between the flexible display device 10 and the rigid housing 40. This gap is created owing to the following reason. That is, because the side wall of the flexible housing 20 is separated from the rigid housing 40 by the gap "y", when the wearable apparatus 1 is rolled up on the long side, a force F that causes the flexible display device 10 to rise in the direction indicated by an arrow F in FIG. 8D is exerted on the flexible display device 10, causing the side wall portion of the flexible housing 20 to be lifted (extended) to create the gap. Therefore, as illustrated in FIG. 8D, when viewed in longitudinal section, the flexible display device 10 is in the shape of an arc that passes through two points at the corner portions of the rigid housing 40. At this time, the ridge lines (fold lines) "x" on the flexible display device 10 which are created in FIGS. 4A and 6A disappear, and the flexible display device 10 forms a curved surface of substantially constant curvature. Further, as illustrated in FIG. 8C, the rounding "r" of the corner portion between the bottom surface and the side wall portion of the rigid housing 40 allows the side wall of the flexible housing 20 to be easily lifted, which aids in deforming the flexible display device 10 into a curved surface.

According to Embodiment 5, the flexible housing 20 and the rigid housing 40 are separated from each other by the gap "y" provided between their respective side wall portions. Therefore, the flexible display device 10 can be deformed into a curved surface of substantially constant curvature without causing the ridge lines "x" to form on the flexible display device 10, thus enhancing the visibility and aesthetic appearance of the display surface.

In Embodiment 5, the rigid housing 40 is disposed in three separate locations, and the gap "y" is provided between the rigid housing 40 located in the middle and the flexible housing 20. If the rigid housing 40 is to be disposed in one or two, or further, four or five separate locations, the gap "y" may be provided in a location where it is desired to deform the flexible display device 10 into a curved surface.

(Embodiment 6)

Figure 9:
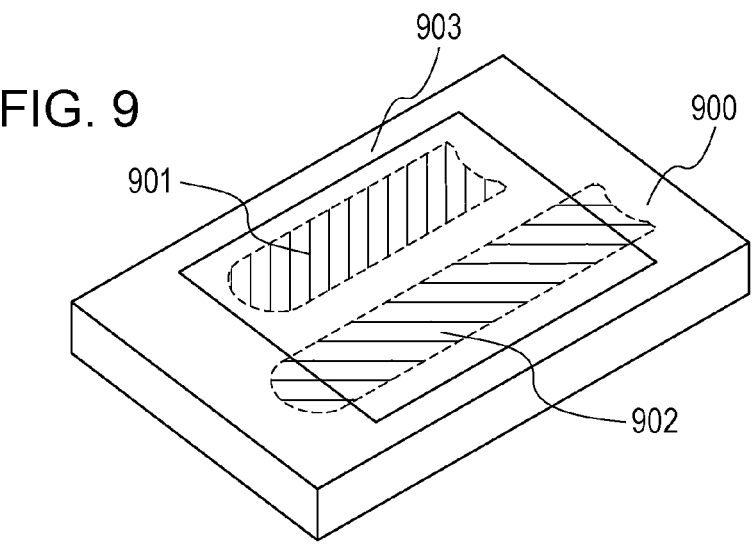
FIG. 9 is a perspective view of a flat state of a wearable apparatus according to Embodiment 6.

FIG. 9 is a perspective view of a flat state of a wearable apparatus according to Embodiment 6 of the present disclosure. In FIG. 9, convex springs 901 and 902 of different lengths are built in an apparatus body 900. The convex spring 901, which is the shorter one, is located on the wrist side, and the convex spring 902, which is the longer one, is located on the upper arm side. Because the convex springs 901 and 902 built in the apparatus body 900 are in a flat state, the apparatus body 900 is also in a flat state. The apparatus body 900 has processing units such as processors and memories (not illustrated), and includes a flexible display 903 that displays the processing results of the processing units.

Figure 10A:
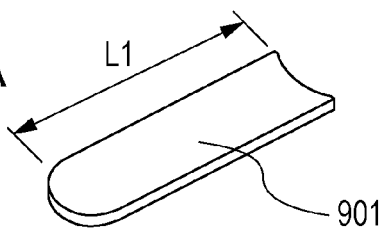
FIG. 10A is a perspective view of a flat state of a convex spring 901 according to Embodiment 6.
Figure 10B:
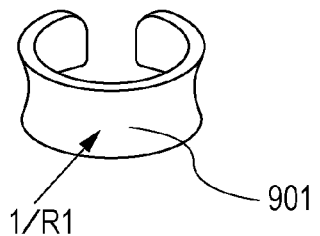
FIG. 10B is a perspective view of a wrapped state of the convex spring 901 according to Embodiment 6.
Figure 10C:
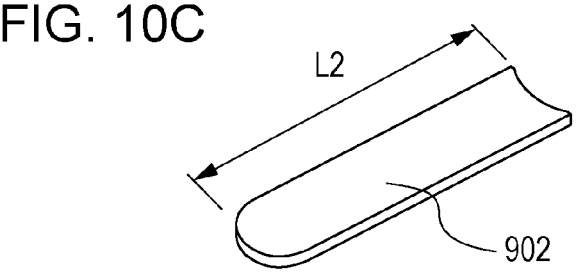
FIG. 10C is a perspective view of a flat state of a convex spring 902 according to Embodiment 6.
Figure 10D:
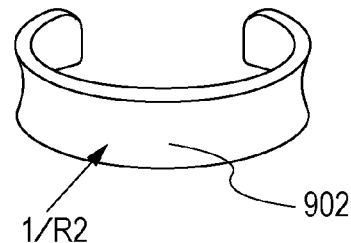
FIG. 10D is a perspective view of a wrapped state of the convex spring 902 according to Embodiment 6.

FIG. 10A is a perspective view of a flat state of the convex spring 901. FIG. 10B is a perspective view of a wrapped state of the convex spring 901. FIG. 10C is a perspective view of a flat state of the convex spring 902. FIG. 10D is a perspective view of a wrapped state of the convex spring 902.

Now, the following relationship holds:

(Equation 3) the length L1 of the convex spring 901<the length L2 of the convex spring 902.

Consequently, the respective curvatures of the convex springs 901 and 902 in the wrapped state are obtained as follows:

(Equation 4) the curvature 1/R1 of the convex spring 901>the curvature 1/R2 of the convex spring 902.

Figure 11:
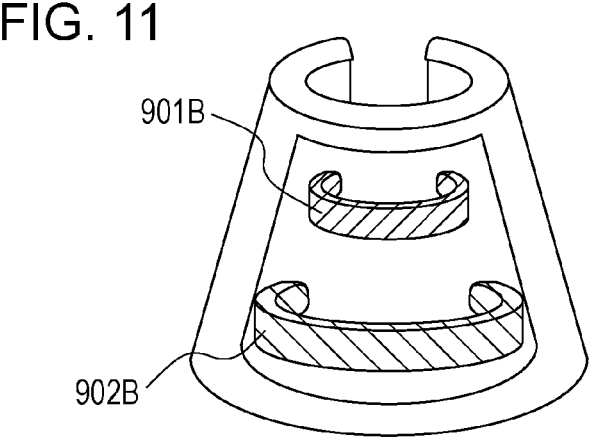
FIG. 11 is a perspective view of a wrapped state of a wearable apparatus according to Embodiment 6.

At this time, the apparatus body 900 can be wrapped and deformed along the convex spring 901 and the convex spring 902, resulting in a wrapped state illustrated in FIG. 11 in which the apparatus body 900 is wrapped in the shape of a cone (truncated cone).

Figure 12:
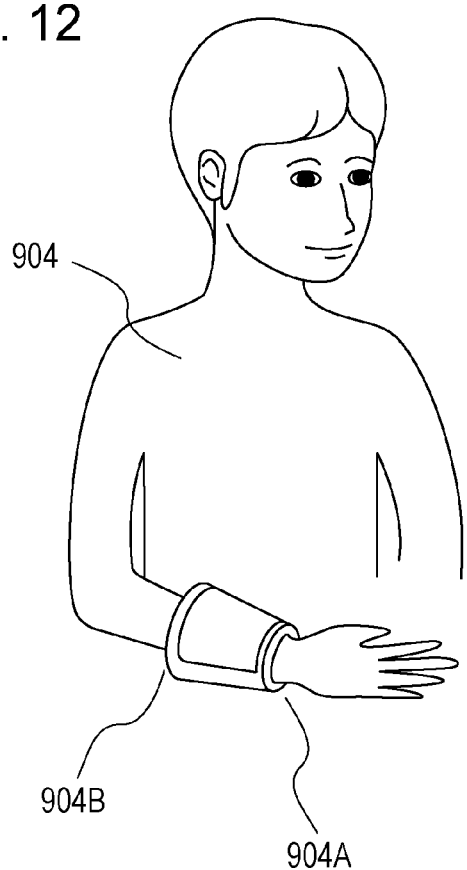
FIG. 12 illustrates a state in which a wearable apparatus is wrapped around a person's arm according to Embodiment 6.

FIG. 12 illustrates a state in which the apparatus body 900 in the wrapped state illustrated in FIG. 11 is worn on the distal end of an arm of a human body 904. When the apparatus body 900 is to be worn near the wrist, the thickness of the arm differs between a wrist side 904A and an upper arm side 904B. At this time, the apparatus body 900 according to Embodiment 6 can be worn near the wrist while absorbing the difference in thickness.

According to this configuration, the convex springs 901 and 902 built in the apparatus body 900 are made to differ in length from each other, allowing changes in the curvature when the apparatus body 900 is in the wrapped state. This improves the wearing comfort of the wearable apparatus, particularly when worn on a portion of the arm near the wrist.

(Embodiment 7)

Figure 13:
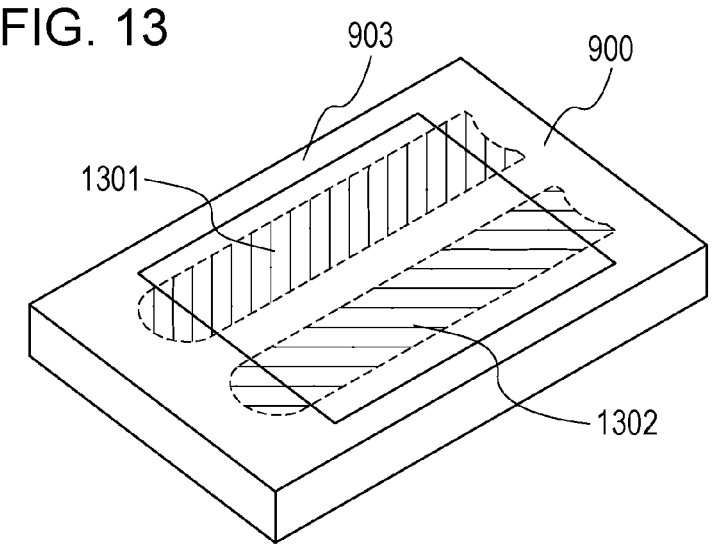
FIG. 13 is a front view of a flat state of a wearable apparatus according to Embodiment 7 and modified Embodiment 7.

FIG. 13 is a perspective view of the apparatus body 900 according to Embodiment 7 of the present disclosure. In FIG. 13, like components are denoted by the same symbols as those in FIG. 9, and a description of such components is omitted.

In FIG. 13, convex springs 1301 and 1302 with the same length and different sectional shapes are built in the apparatus body 900. Because the convex springs 1301 and 1302 built in the apparatus body 900 are in a flat state, the apparatus body 900 is also in a flat state. The apparatus body 900 has processing units such as processors and memories (not illustrated), and includes the flexible display 903 that displays the processing results of the processing units.

Figure 14A:
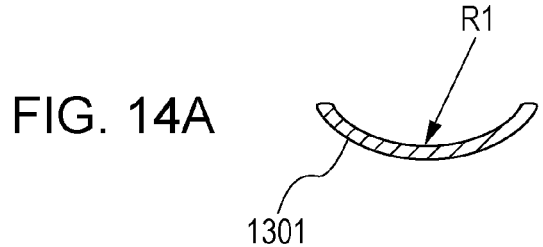
FIG. 14A is a sectional view of a convex spring 1301 according to Embodiment 7.
Figure 14B:
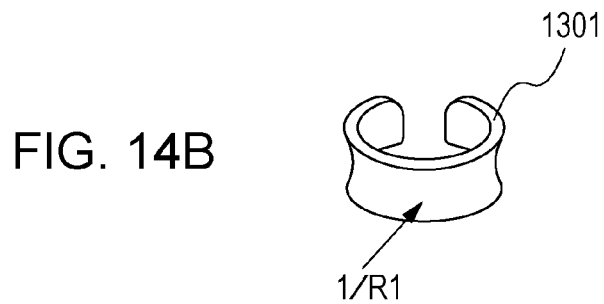
FIG. 14B is a perspective view of the convex spring 1301 according to Embodiment 7.
Figure 14C:
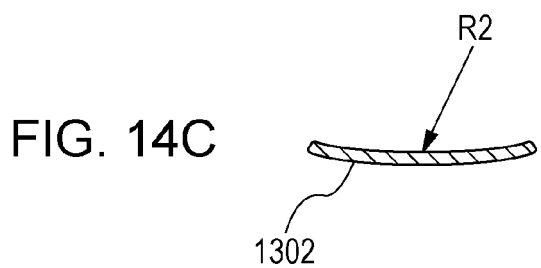
FIG. 14C is a sectional view of a convex spring 1302 according to Embodiment 7.
Figure 14D:
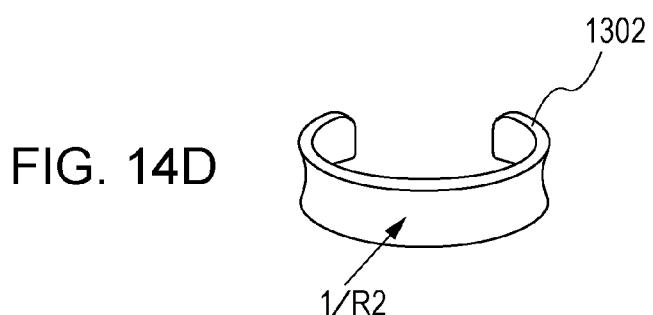
FIG. 14D is a perspective view of the convex spring 1302 according to Embodiment 7.

FIG. 14A is a sectional view, taken along the transverse direction, of the convex spring 1301 in a flat state. FIG. 14B is a perspective view of a wrapped state of the convex spring 1301. FIG. 14C is a sectional view, taken along the transverse direction, of the convex spring 1302 in a flat state. FIG. 14D is a perspective view of a wrapped state of the convex spring 1302.

Now, the following relationship holds:

(Equation 5) the sectional radius R1 of the convex spring 1301 < the sectional radius R2 of the convex spring 1302.

Consequently, the curvatures of the convex springs in the wrapped state have the following relationship:

(Equation 6) the curvature 1/R1 of the convex spring 1301>the curvature 1/R2 of the convex spring 1302.

At this time, the apparatus body 900 can be wrapped and deformed along the convex spring 1301 and the convex spring 1302, resulting in a wrapped state in which the apparatus body is wrapped in the shape of a cone (truncated cone) as in FIG. 11.

According to this configuration, the convex springs built in the apparatus body are made to differ in sectional radius R from each other, allowing changes in the curvature when wrapping on the apparatus body. This improves wearing comfort of the wearable apparatus, particularly when worn on a portion of the arm near the wrist.

Modification

FIG. 15 illustrates a case in which, instead of the convex springs 1301 and 1302 that differ in sectional radius R, convex springs 1501 and 1502 that differ in spring plate thickness are used.

Figure 15A:
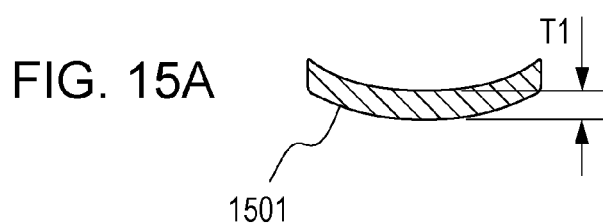
FIG. 15A is a sectional view of a convex spring 1501 according to modified Embodiment 7.
Figure 15B:
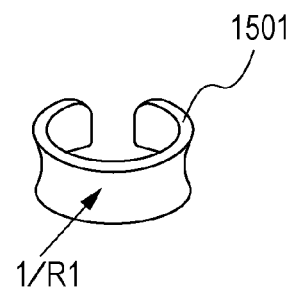
FIG. 15B is a perspective view of the convex spring 1501 according to modified Embodiment 7.
Figure 15C:
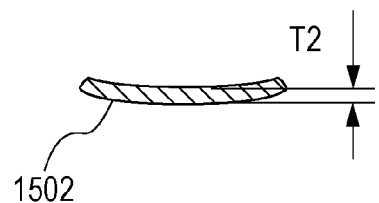
FIG. 15C is a sectional view of a convex spring 1502 according to modified Embodiment 7.
Figure 15D:
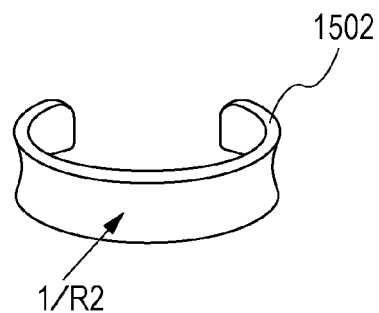
FIG. 15D is a perspective view of the convex spring 1502 according to modified Embodiment 7.

FIG. 15A is a sectional view, taken along the transverse direction, of the convex spring 1501 in a flat state. FIG. 15B is a perspective view of a wrapped state of the convex spring 1501. FIG. 15C is a sectional view, taken along the transverse direction, of the convex spring 1502 in a flat state. FIG. 15D is a perspective view of a wrapped state of the convex spring 1502.

Now, the following relationship holds:

(Equation 7) the thickness T1 of the convex spring 1501>the thickness T2 of the convex spring 1502.

Consequently, the curvatures of the convex springs in the wrapped state have the following relationship:

(Equation 8) the curvature 1/R1 of the convex spring 1501>the curvature 1/R2 of the convex spring 1502.

At this time, the apparatus body 900 can be wrapped and deformed along the convex spring 1501 and the convex spring 1502, resulting in a wrapped state in which the apparatus body is wrapped in the shape of a cone (truncated cone) as in FIG. 11.

According to this configuration, the convex springs built in the apparatus body are made to differ in spring plate thickness from each other, allowing changes in curvature when wrapping on the apparatus body. This improves the wearing comfort of the wearable apparatus, particularly when worn on a portion of the arm near the wrist.

In the embodiments and the modification mentioned above, there are two convex springs. However, multiple convex springs may be provided. Further, the sectional shape of the convex springs is not limited to a round one but may be deformed. Furthermore, the convex springs used may have the same shape but their materials themselves may differ in hardness. Alternatively, convex springs that differ in hardness owing to surface treatment may be used. Each of the length, the sectional radius R, the spring plate thickness, and the like of the convex springs may be changed not singly but in combination with each other.

The body part on which the wearable apparatus is to be worn is not limited to an arm but may be a leg, neck, finger, or the like. The wearable apparatus may not necessarily be worn on the human body. The wearable apparatus may be worn on a living thing other than the human body, such as a pet, or on a lifeless thing such as a pole (bar). Further, the present disclosure is applicable not only to electronic apparatuses but also anything used by being worn on an object, such as accessories, arm bands, covers, signs, or reflector plates.

(Embodiment 8)

Figure 16A:
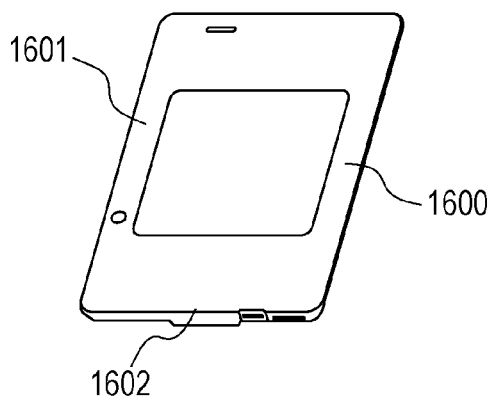
FIG. 16A is a perspective view of a flat state of a wearable apparatus according to Embodiment 8.
Figure 16B:
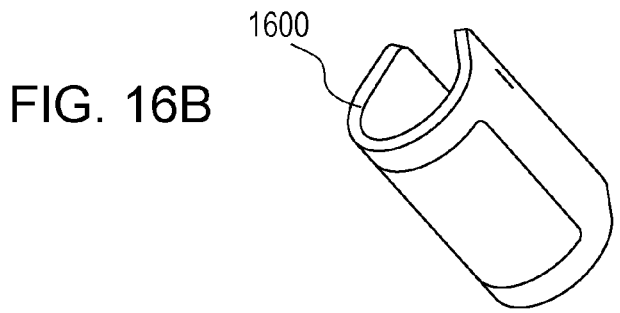
FIG. 16B is a perspective view of a wrapped state of a wearable apparatus according to Embodiment 8.

FIG. 16A is a perspective view of a flat state of a wearable apparatus according to Embodiment 8. FIG. 16B is a perspective view of a wrapped state of a wearable apparatus according to Embodiment 8. In FIG. 16A, an apparatus body 1600 is roughly made up of an apparatus body front member 1601 and an apparatus body back member 1602. As the apparatus body front member 1601, for example, a flexible display may be used. Use of a flexible display allows the apparatus body 1600 to be deformed between the flat state illustrated in FIG. 16A and the wrapped state illustrated in FIG. 16B. As a result, the wearable apparatus can be wrapped on an arm or the like for use. Further, the apparatus body 1600 has processing units such as processors and memories (not illustrated), and the processing results of the processing units are displayed on the flexible display.

Figure 17:
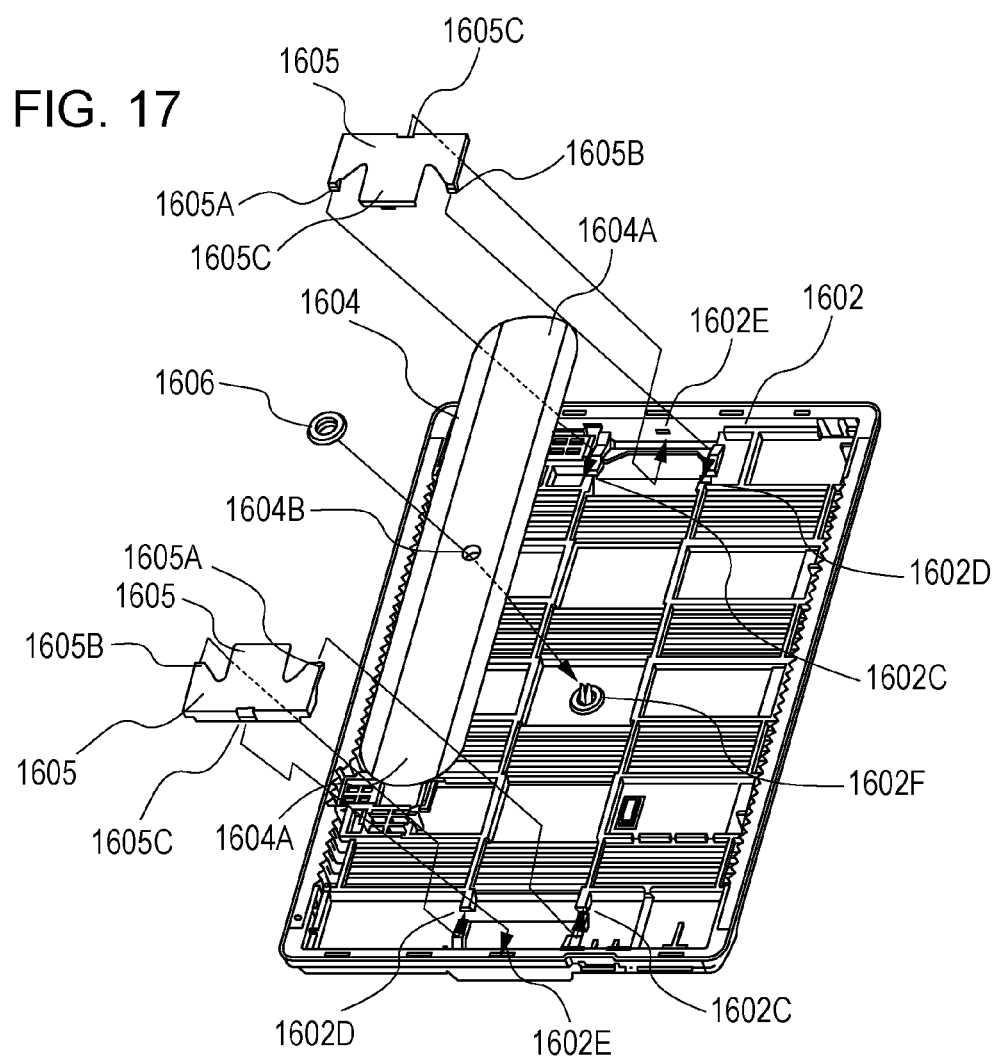
FIG. 17 is an exploded perspective view of a portion around a convex-Spring holding structure part according to Embodiment 8.
Figure 18:
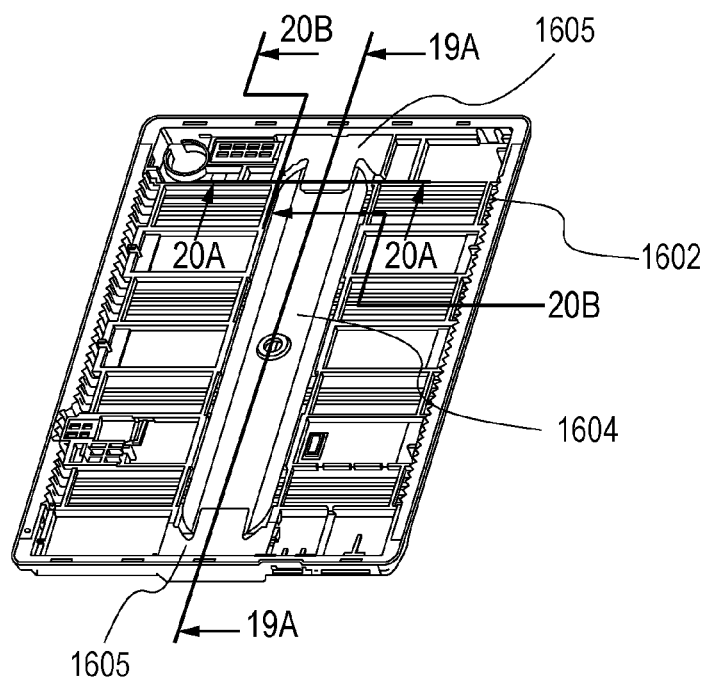
FIG. 18 is a perspective view of a portion around a convex-spring holding structure part according to Embodiment 8.
Figure 19A:
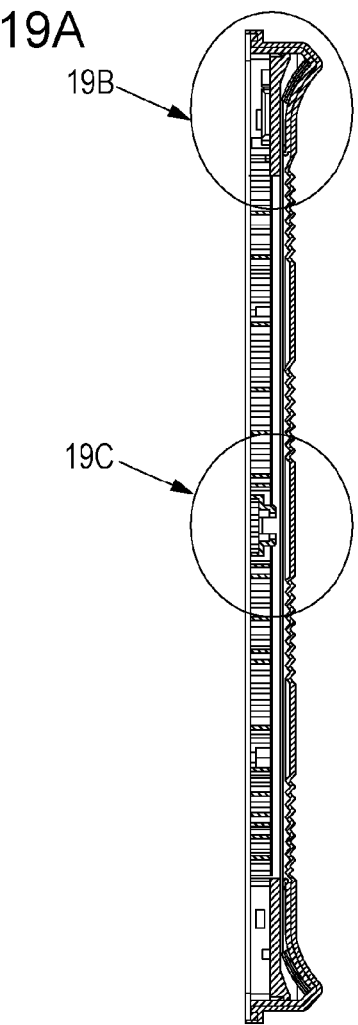
FIG. 19A is a sectional view, taken along a line 19A-19A, of the wearable apparatus illustrated in FIG. 18.
Figure 19B:
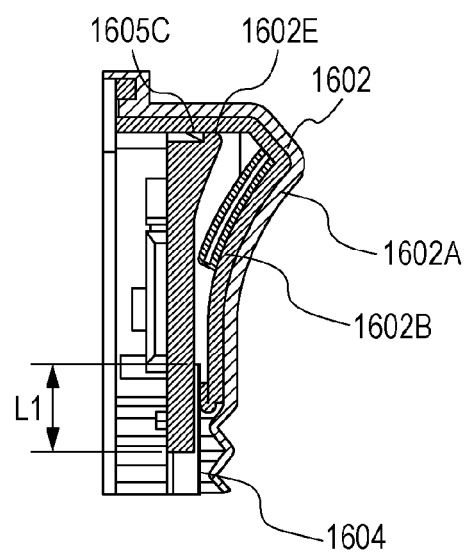
FIG. 19B is a detail drawing of a portion 19B of the wearable apparatus illustrated in FIG. 19A.
Figure 19C:
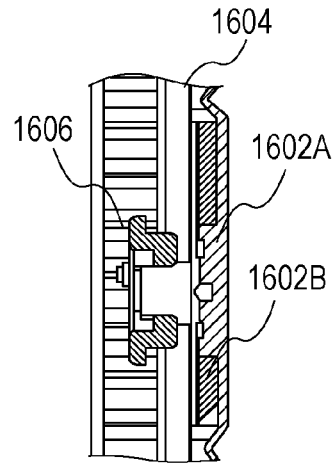
FIG. 19C is a detail drawing of a portion 19C of the wearable apparatus illustrated in FIG. 19A.
Figure 20A:
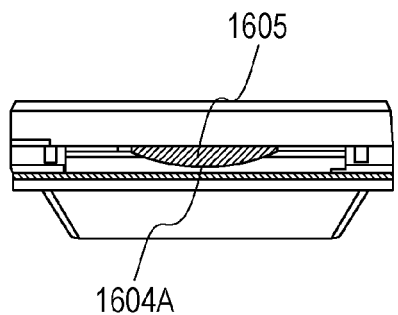
FIG. 20A is a sectional view, taken along a line 20A-20A, of the wearable apparatus illustrated in FIG. 18.
Figure 20B:
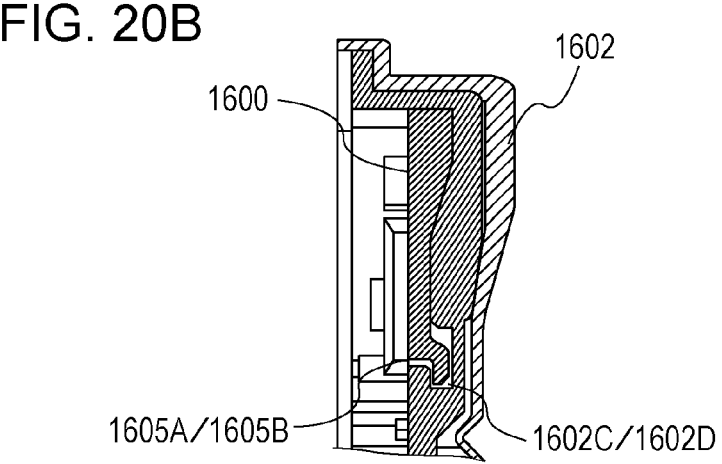
FIG. 20B is a sectional view, taken along a line 20B-20B, of the wearable apparatus illustrated in FIG. 18.

FIG. 17 is an exploded perspective view of a portion around a convex-spring holding structure part according to Embodiment 8. FIG. 18 is a perspective view of a portion around a convex-spring holding structure part according to Embodiment 8. FIG. 19A is a sectional view, taken along a line 19A-19A, of the wearable apparatus illustrated in FIG. 18. FIG. 19B is a detail drawing of a portion 19B of the wearable apparatus illustrated in FIG. 19A. FIG. 19C is a detail drawing of a portion 19C of the wearable apparatus illustrated in FIG. 19A. FIG. 20A is a sectional view, taken along a line 20A-20A, of the wearable apparatus illustrated in FIG. 18. FIG. 20B is a sectional view, taken along a line 20B-20B, of the wearable apparatus illustrated in FIG. 18.

In FIGS. 17 to 20, the apparatus body back member 1602 includes a soft material part 1602A made of a rubber material or the like that enables deformation of the apparatus body, and a hard material part 1602B made of a resin material or the like. A convex-spring center holding part 1604B of a convex spring 1604 is inserted into a convex-spring center holding part 1602F of the apparatus body back member 1602, and from above the convex-spring center holding part 1604B, positioning of the substantially central portion of the convex spring 1604 is effected by a center holder 1606.

An end face holder 1605 is engaged with either end face of the convex spring 1604. Fixing parts 1605A, 1605B, and 1605C of the end face holder 1605 with respect to the apparatus body back member are engaged with end-face-holder fixing parts 1602C, 1602D, and 1602E of the apparatus body back member 1602, respectively. As a result, the position of a convex-spring end face holding part 1604A is regulated with respect to the apparatus body back member 1602.

In this regard, the dimensions of the convex-spring end face holding part 1604A are set so that the convex-spring end face holding part 1604A is engaged with the end face holder 1605 over the length L1 at all times. Further, the engaging part is engaged with the hard material part 1602B of the apparatus body back member 1602, allowing the end face holder 1605 to be reliably held and fixed in place. As this engagement structure, one based on fitting of claws is mainly explained with reference to FIGS. 19 and 20. However, for example, this engagement structure can be implemented by another structure such as a screw-down structure.

Figure 21A:
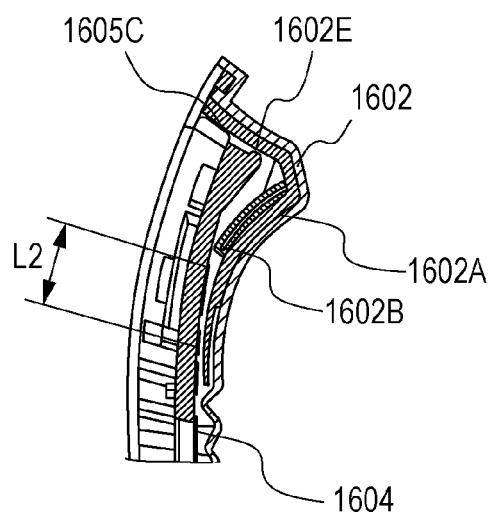
FIG. 21A is a detail drawing of the portion 19B when a wearable apparatus is in a wrapped state.
Figure 21B:
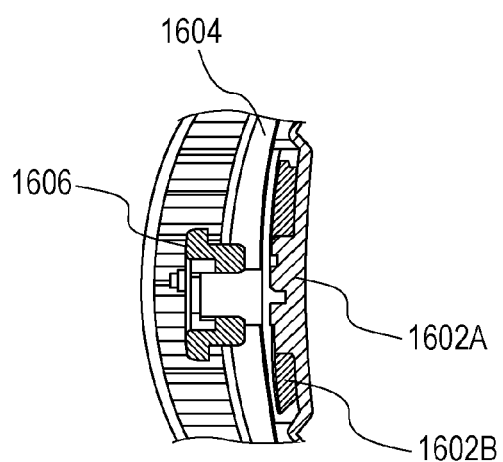
FIG. 21B is a detail drawing of the portion 19C when a wearable apparatus is in a wrapped state.

FIG. 21 is a detail drawing illustrating a state in which portions corresponding to detail drawings of the portions 19B and 19C of the sectional view illustrated in FIG. 19A are deformed into a wrapped state by means of the convex spring 1604. As illustrated in FIG. 21, owing to the center holder, the substantially central portion of the convex spring 1604 does not greatly move in position even in the wrapped state. Further, the dimensions of the convex-spring end face holding part 1604A are set so that the convex-spring end face holding part 1604A is engaged with the end face holder 1605 over the length L2 at all times. That is, the convex-spring end face holding part 1604A have dimensions that ensure that the relationship L1<L2 holds.

According to this configuration, the convex spring 1604 built in the apparatus body 1600 is deployed in a stable position in both the flat and wrapped states of the apparatus body 1600. Further, by pinching and manipulating the end face holder 1605, the need for consciously searching for and manipulating the end face of the convex spring 1604 is eliminated, thus enhancing the ease of manipulation.

In Embodiment 8, the substantially central and opposite end portions of the convex spring are held in place for positioning. However, for the substantially central portion, in particular, the location at which to hold the convex spring is not limited to one location but it is also conceivable to provide multiple such locations as long as these locations do not hinder wrapping of the convex spring. Further, the sectional shape of the convex spring is not limited to a round one but may be deformed. Further, multiple convex springs may be used in a parallel or overlapping fashion, for example. Further, the body part on which the wearable apparatus is to be worn is not limited to an arm but may be a leg, neck, finger, or the like. The wearable apparatus may not necessarily be worn on the human body. The wearable apparatus may be worn on a living thing other than the human body, such as a pet, or on a lifeless thing such as a pole (bar). Further, the present disclosure is applicable not only to electronic apparatuses but also anything to be used by being worn on an object, such as accessories, arm bands, covers, signs, or reflector plates.

INDUSTRIAL APPLICABILITY

The wearable apparatus according to the present disclosure finds utility as, for example, a wearable terminal that can be rolled up and worn on an arm or the like. The wearable apparatus according to the present disclosure can be also adapted to applications in which the wearable apparatus is used by being wrapped around a bar-like object such as a handlebar of a bicycle.

REFERENCE SIGNS LIST 1 wearable apparatus
10 flexible display device
20 flexible housing
21 sticking seat surface
22 bellows structure
30 component block
31 flexible cable
40 rigid housing
900 apparatus body
901, 902, 1301, 1302, 1501, 1502 convex spring
903 flexible display
904 human body
904A wrist side
904B upper arm side
1600 apparatus body
1601 apparatus body front member
1602 apparatus body back member
1602A soft material part
1602B hard material part
1602C, 1602D, 1602E end-face-holder fixing part
1602F convex-spring center holding part
1604 convex spring
1604A convex-spring end face holding part
1604B convex-spring center holding part
1605 end face holder
1605A, 1605B, 1605C fixing portion with respect to apparatus body back member
1606 center holder

The invention claimed is:

1. A wearable apparatus comprising:
a flexible display device; and
a flexible housing that holds a peripheral portion of the display device,
wherein the flexible display device is disposed on an uppermost surface of the wearable apparatus to serve as a reference for defining a total length of the wearable apparatus, and
wherein a portion of the apparatus below the flexible display device contracts along a direction of the total length.

2. The wearable apparatus according to claim 1, wherein:
the flexible housing has a rigid housing part; and
a rigid device for causing the wearable apparatus to function is disposed in the rigid housing part.

3. The wearable apparatus according to claim 1, wherein the flexible housing includes a bellows structure.

4. The wearable apparatus according to claim 3, wherein:
the flexible housing is made of an elastomer resin;
the rigid housing part is made of a resin having a low flexibility; and
the flexible housing and the rigid housing part are formed integrally.

5. The wearable apparatus according to claim 2, wherein in a side wall portion of the flexible housing which holds the peripheral portion of the flexible display device, at least two locations on both sides of a substantially central portion of the display device are separated from the rigid housing part.

6. A wearable apparatus comprising:
an apparatus body; and
a plurality of convex springs,
wherein at least two of the plurality of convex springs have different spring characteristics from each other.

7. The wearable apparatus according to claim 6, wherein the spring characteristics include at least one of a length along a longitudinal direction, a sectional radius R along a transverse direction, and a spring plate thickness.

8. The wearable apparatus according to claim 6, wherein the plurality of convex springs are built in the apparatus body, and are disposed side by side in a transverse direction.

9. The wearable apparatus according to claim 6, further comprising:
a flexible display,
wherein the flexible display is disposed at a position that is visible from outside of the apparatus body when the convex springs are in a wrapped state.

10. A wearable apparatus comprising:
an apparatus body;
a convex spring;
a center holding part that holds a substantially central portion of the convex spring to the apparatus body; and
an end face holding part that is engaged with the apparatus body to hold the convex spring.

11. The wearable apparatus according to claim 10, wherein the end face holding part has a length that reliably covers an end face portion of the convex spring, in both a flat state and a wrapped state of the apparatus body.

12. The wearable apparatus according to claim 10, wherein the end face holding part has a shape that closely resembles a round sectional shape of the convex spring when the convex spring is in a flat state.

13. The wearable apparatus according to claim 10, wherein the end face holding part is attached to an end face position of the apparatus body.

* * * * *